United States Patent
Bürgi et al.

(10) Patent No.: US 8,295,324 B2
(45) Date of Patent: Oct. 23, 2012

(54) METHOD OF PROCESSING A DIGITAL SIGNAL DERIVED FROM A DIRECT-SEQUENCE SPREAD SPECTRUM SIGNAL AND A RECEIVER

(75) Inventors: Clemens Bürgi, Zürich (CH); Marcel Baracchi, Biel (CH); Grégoire Waelchli, Biel (CH)

(73) Assignee: u-blox AG, Thalwil (CH)

( * ) Notice: Subject to any disclaimer, the term of this patent is extended or adjusted under 35 U.S.C. 154(b) by 265 days.

(21) Appl. No.: 12/694,145

(22) Filed: Jan. 26, 2010

(65) Prior Publication Data

US 2010/0189163 A1 Jul. 29, 2010

(30) Foreign Application Priority Data

Jan. 27, 2009 (EP) .................................... 09405015
Nov. 26, 2009 (EP) .................................... 09405207

(51) Int. Cl.
*H04B 1/00* (2006.01)
(52) U.S. Cl. ........ 375/142; 375/141; 375/140; 375/130; 375/341; 375/144; 375/147; 375/148; 370/350; 455/132; 455/133; 455/134; 455/135; 455/136; 455/137
(58) Field of Classification Search .................. 375/142, 375/141, 140, 130, 262, 341, 144, 147, 148; 370/350; 455/132, 133, 134, 135, 136, 137
See application file for complete search history.

(56) References Cited

U.S. PATENT DOCUMENTS 7,403,559 B1 7/2008 Fisher et al.
(Continued)

FOREIGN PATENT DOCUMENTS

EP 1387499 A1 2/2004
(Continued)

OTHER PUBLICATIONS

European Search Report for European Patent Application EP 09 40 5015, 2 pages, dated Jul. 28, 2009.
(Continued)

*Primary Examiner* — Zewdu Kassa
(74) *Attorney, Agent, or Firm* — Edward B. Weller

(57) ABSTRACT

Complex digital data values derived from a DSSS signal, in particular, a GNSS signal, are delivered to a general purpose microprocessor at a rate of 8 MHz and chip sums over eight consecutive data values spaced by a sampling length ($T_S$), each beginning with one of the data values as an initial value, formed and stored. For code removal, each of a series of chip sums covering a correlation interval of 1 ms and each essentially coinciding with a chip interval of fixed chip length ($T_C$), where a value of a basic function ($b_m$) reflecting a PRN basic sequence of a satellite assumes a correlation value ($B_m$), is multiplied by the latter and the products added up over a partial correlation interval to form a partial correlation sum. The partial correlation interval is chosen in such a way that it essentially coincides with a corresponding Doppler interval having a Doppler length ($T_D$) where a frequency function used for tentative Doppler shift compensation and represented by a step function (sine, cosine) is constant. The partial correlation sums are then each multiplied by the value assumed by the frequency function in the corresponding Doppler interval and the products added up to form a correlation sum.

19 Claims, 3 Drawing Sheets

U.S. PATENT DOCUMENTS

| | | |
|---|---|---|
| 2004/0120385 A1 | 6/2004 | Mattos et al. |
| 2007/0160121 A1* | 7/2007 | Abraham et al. ............. 375/150 |
| 2008/0232441 A1 | 9/2008 | Mester et al. |
| 2009/0079627 A1 | 3/2009 | Sun et al. |

FOREIGN PATENT DOCUMENTS

| | | |
|---|---|---|
| EP | 1983351 A1 | 10/2008 |
| WO | 2009003092 A | 12/2008 |

OTHER PUBLICATIONS

Extended European Search Report for European Patent Application EP 09 40 5207.3, 5 pages, dated Nov. 8, 2011.

Waelchli "Performances of a New Correlation Algorithm for a Platform-independent GPS Software Receiver" ION 2009 International Technical Meeting, Anaheim, CA, Jan. 26, 2009, pp. 1062-1067.

* cited by examiner

METHOD OF PROCESSING A DIGITAL SIGNAL DERIVED FROM A DIRECT-SEQUENCE SPREAD SPECTRUM SIGNAL AND A RECEIVER

RELATED APPLICATIONS

This application claims the benefit of priority under 35 USC §119 to EP Patent Application No. 09405015.0 filed on Jan. 27, 2009 and EP Patent Application No. 09405207.3 filed on Nov. 26, 2009, the entire contents of both are incorporated herein by reference.

FIELD OF THE INVENTION

The invention concerns a method of processing a digital signal derived from a direct-sequence spread spectrum (DSSS) signal, e.g., an analog input signal of a GNSS receiver which contains signals emitted by satellites of GNSS (Global Navigation Satellite System) positioning systems like GPS (Global Positioning System), GLONASS (Global Navigation Satellite System) and GALILEO in order to determine a position, and a receiver.

PRIOR ART

It is well known to reduce the complex digital signal derived from an analog input signal of a GNSS receiver to an intermediate frequency, convert it to a digital data signal, i.e., a series of complex digital data values, with a carrier having a frequency of several MHz and, after having multiplied it for Doppler removal with several frequency functions in a complex mixer, correlate the results for code removal with copies of a basic sequence of one of various GNSS satellites having different phase positions with respect to the digital data signal in parallel, by multiplying every data value with a value of one of the copies of the basic sequence in each case and adding up the products. This method which is described, e.g., in EP 1 983 351 A1, which is incorporated herein by reference in its entirety, requires considerable processing power and is carried out by dedicated hardware.

From EP 1 722 487, which is incorporated herein by reference in its entirety, a method is known where the order of Doppler compensation and correlation is in part reversed. For Doppler removal a frequency function is used which is a step function approximating a complex exponential function and partial correlations between the data sequence and a copy of the basic sequence over Doppler intervals where the frequency function is constant are calculated and then the partial correlation sums each multiplied with the value of the frequency function in the respective Doppler interval and the products added up to determine a correlation sum. A method of the generic type is described with respect to the calculation of partial correlations. In contrast to the method used for Doppler compensation, partial correlations are determined with each data value being multiplied by its corresponding correlation value separately although there are two or more of them per chip.

Other prior art documents also show correlation methods where every data value is multiplied separately with its corresponding correlation value and the products added up. According to US 2007/160 121 A1, which is incorporated herein by reference in its entirety, for instance, another method offering half-chip phase resolution is described where partial correlations are calculated in this way. An initial digital data sequence is first downsampled, e.g., by pre-summation, so as to yield exactly two digital data values per chip while the correlation sequence is extended, i.e., every correlation value duplicated before the multiplications are carried out.

This method is rather uneconomical regarding requirements of processing power and memory, particularly if it is extended to higher resolutions.

SUMMARY OF THE INVENTION

It is an object of the invention to provide a method of processing a digital signal derived from a direct-sequence spread spectrum analog signal containing at least one encoded binary sequence consisting of repetitions of a characteristic basic sequence which extends over a basic interval to determine a multiplicity of correlation sums which uses only relatively modest processing power even for high phase resolutions.

The simplification of the correlation process makes it feasible to process the digital data signal to a considerable extent on a general purpose microprocessor. In particular, a portable general purpose computer comprising such microprocessor, like a PDA (personal digital assistant), can be used while dedicated hardware is restricted to a relatively simple and cheap front-end circuit comprising a radio frequency part and a simple base-band pre-processing part which can be integrated on a single chip.

It is a further object of the invention to provide a receiver for receiving a direct-sequence spread spectrum analog signal containing at least one encoded binary sequence consisting of repetitions of a characteristic basic sequence which extends over a basic interval and deriving a digital signal from the same and determining from the digital signal a multiplicity of correlation sums which is relatively simple and easy to produce.

BRIEF DESCRIPTION OF THE DRAWINGS

In the following the invention is described in more detail with reference to drawings where.

DESCRIPTION OF THE PREFERRED EMBODIMENTS

Figure 1:
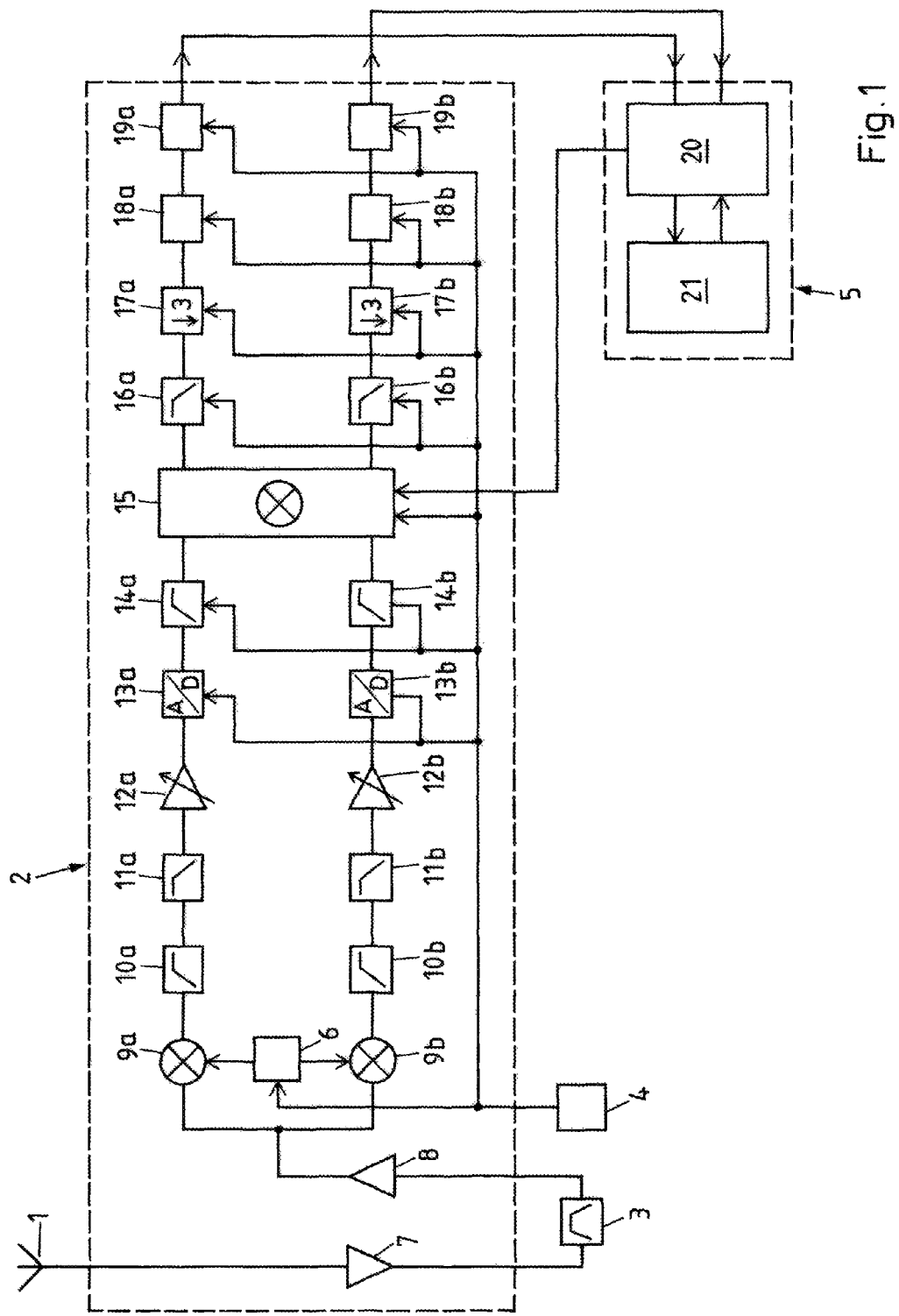
FIG. 1 shows a GPS receiver suitable for carrying out the method according to the invention.

The embodiment described in the following is a receiver suitable for GPS. The modifications which are necessary if other GNSS systems like GLONASS or GALILEO are to be used are in general straightforward. The receiver comprises (FIG. 1) an antenna 1 followed by a front-end circuit 2 with a radio frequency part and a base-band pre-processing part, preferably, but not necessarily, on a single chip, a bandpass filter 3, a TCXO (temperature compensated crystal oscillator) 4 and a base-band processor 5 which may be a general purpose computer, e.g., a portable computer like a PDA, to which digital data from the front-end circuit 2 can be transmitted via a suitable interface and which in turn controls components of the front-end circuit 2.

The bandpass filter 3, usually an SAW (surface acoustic wave) filter, is a component that may be external to the front-end circuit 2. The TCXO 4, also may be a separate component, provides a basic frequency of between 19 MHz and 40 MHz, e.g., 24 MHz, which is fed to the front-end circuit 2.

The frequencies, clock rates, filter frequencies, and the like enumerated herein are for illustrative purposes, other frequencies, clock rates, filter frequencies, and the like may be used in the receiver. In the front-end circuit 2 the output signal of TCXO 4 controls a PLL (phase lock loop) unit 6 which produces a 3,158 MHz clock signal from which two further clock signals with half the clock rate, e.g., 1,579 MHz, are derived with one of the clock signals phase-shifted by 90° with respect to the other.

The antenna input of the front-end circuit 2 is followed by a low noise amplifier 7 which is connected, via the external band pass filter 3 and a controllable RF amplifier 8, to mixers 9a, 9b which also receive the clock signals from PLL unit 6. Together they form a complex mixer which provides I and Q components of a complex analog signal shifted down to an intermediate frequency of approximately 3 MHz. They are each followed by a high pass filter 10a, 10b with a cutoff frequency of about 20 kHz and a low pass filter 11a, 11b with a cutoff frequency of around 7.5 MHz which are connected, via programmable gain amplifiers 12a, 12b to A/D (analog-to digital) converters 13a, 13b with 3 bit resolutions for sampling the input signal with a sampling rate of 24 MHz, producing a complex digital signal which is, via high pass filters 14a, 14b, fed to a complex digital mixer 15 that essentially reduces it to base-band. The mixer 15 is followed by low pass filters 16a, 16b, each with a cut-off frequency of 3 MHz, down-samplers 17a, 17b, FIR (finite impulse response) filter circuits 18a, 18b and data converters 19a, 19b whose outputs are connected to output lines of the front-end circuit 2 which are in turn connected to input lines of base band processor 5. A/D converters 13a, 13b, high pass filters 14a, 14b, mixer 15, low pass filters 16a, 16b, down-samplers 17a, 17b, FIR filter circuits 18a, 18b and data converters 19a, 19b are controlled by the clock signal.

The base-band processor 5 comprises a general purpose microprocessor 20 and a memory unit 21. The base-band processor 5 comprises input and output devices, e.g., a keypad and a liquid crystal display (not shown).

After the analog signal received by the antenna 1 (FIG. 1) has been amplified by low noise amplifier 7 its spectrum is reduced to a 30 MHz band centered at the GPS frequency of 1,575.42 MHz by band pass filter 3. After further amplification and mixing any DC component is removed by high pass filters 10a, 10b and high frequencies are suppressed by low pass filters 11a, 11b for anti-aliasing. The low pass filters 11a, 11b attenuate the signal, with respect to the signal at a reference frequency of 3 MHz, by not more than −3 dB at 7.5 MHz and by at least −12 dB at 12 MHz, e.g., at half the sampling rate of A/D converters 13a, 13b. The programmable gain amplifiers 12a, 12b adjust the signal to the input range of the A/D converters 13a, 13b.

The amplified and filtered complex analog signal is then converted to a complex digital signal by A/D converters 13a, 13b, filtered by high pass filters 14a, 14b and then derotated, e.g., shifted essentially to zero carrier by complex digital mixer 15. After it has passed low pass filters 16a, 16b its sampling rate is reduced to 8 MHz by down-samplers 17a, 17b. By FIR filter circuits 18a, 18b each one of the resulting digital data values is replaced by a chip sum formed by adding up a step number of consecutive components starting with the data value in question (details are explained below). In data converters 19a, 19b the sums are converted to a data format suitable for their delivery to the input lines of base-band processor 5.

In base-band processor 5, the chip sums are sequentially fed to a microprocessor 20 and stored in memory unit 21. Later they are processed in microprocessor 20 according to specific software also stored in memory unit 21. Normally, the chip sums are used either for signal acquisition or for tracking of already identified signals. Both processes, however, use a correlation process involving code removal and Doppler removal.

The digital data sequence contains a superposition of the characteristic sequences of all GPS satellites which are in view of the receiver, each with a carrier and data bits superposed. The characteristic sequence is a repetition of a pseudo random noise basic sequence consisting of 1,023 chips which fills a basic interval of 1 millisecond. The carrier results from the Doppler shift of the signal which depends on the velocity of the satellite and is, for terrestrial applications, contained in the interval [−5 kHz, +5 kHz]. Clock drift may cause an additional apparent frequency shift which can be as large as 50 kHz but as it is independent of individual satellites it can be compensated for before the data sequence arrives at the base-band processor 5 by choosing the frequency of mixer 15 accordingly.

Disregarding possible clock drift one may assume that the data sequence arrives at the inputs of FIR filter circuits 18a, 18b at a rate of 8 MHz and encodes a characteristic sequence of a given satellite m with a chip rate of 1.023 MHz and a carrier frequency of between −5 kHz and +5 kHz. The influence of Doppler shift on the chip rate may be disregarded as long as the sequence of digital data values does not extend beyond about 10 milliseconds.

For simplicity, it is assumed in the following that the correlation process is carried out with a data sequence extending essentially over a correlation interval $[0,T]$ where T is chosen as 1 millisecond, e.g., the correlation interval extends over the length of one basic interval. In this case, not only is the influence of Doppler shift on the chip rate negligible but also occurrence of an inversion of the basic sequence by superposed data bits during the correlation interval unlikely as data bits are constant over twenty consecutive repetitions of the basic sequence. From the sequence of complex digital data values $C(j)=(C_I(j),C_Q(j))$ a sequence of complex chip sums $F(i)=(F_I(i),F_Q(i))$, $i=0, \ldots, N_S-1$, with $N_S$ the number of samples within the correlation interval and at the same time the number of chip sums, is formed according to $$F(i) = \sum_{j=0}^{\Delta_i - 1} C(i+j) \qquad (1)$$

in FIR filter circuits 18a, 18b, and are stored in the memory unit 21 and later processed. $\Delta_i$ is a step number which assumes one of two consecutive integer step number values $n_S^-$ or $n_S^+$, in the example seven and eight, respectively. Of course, consecutive chip sums overlap by seven or six digital data values. Details are explained below.

The sampling length $T_S$, e.g., the length of the sampling interval between two consecutive data values or chip sums, is $T_S=T/N_S$, which in the example where $N_S=8,000$ equals 0.125 microseconds. The vectors C and F may be considered as cyclic entities with $C(j)=C(j \bmod N_S)$, $F(i)=F(i \bmod N_S)$ and thereby extended beyond the interval of $[0,N_S-1]$, e.g., beyond the correlation interval $[0,T]$.

For the following explanations it is assumed that the C(j) define a step function $c(t)=(c_I(t),c_Q(t))$ of time t defined in the correlation interval $[0,T]$, where $$c(t)=C(j) \text{ for } jT_S \leq t \leq (j+1)T_S, \qquad (2)$$

with $j=0, \ldots, N_S-1$.

Similarly, with $T_C$ the chip length, that is, the length of the chip interval which equals the length of the correlation interval T divided by the number of chips $N_C$, a correlation function derived from the correlation sequence of the satellite m is $$b_m(t)=B_m(k) \text{ for } kT_C \leq t \leq (k+1)T_C, \quad (3)$$

where $k=0, \ldots, N_C-1$ is also considered to be a step function. The correlation values $B_m(k)$, either +1 or −1, are defined for $k=0, \ldots, 1,022$ as the values of the characteristic sequence of satellite m and beyond this range by cyclic extension. In the example, $N_C=1,023$ and $T_C=T/N_C=1/1,023$ milliseconds≈0.9775 microseconds. Both c(t) and $b_m(t)$ are in the following considered cyclic functions with a period of T which can thereby be extended beyond the correlation interval.

If c(t) is multiplied with an internally provided frequency function $\exp(2\pi i f_D t)$ for attempted Doppler compensation with $f_D$ the assumed Doppler frequency, the correlation sum indicating the correlation between the signal c(t) and the equally internally provided correlation function $b_m(t)$ equals $$C_T(m, \tau, f_D) = \left| \int_0^T e^{2\pi i f_D t} b_m(t) c(t-\tau) dt \right| \quad (4)$$

where $\tau$ signifies the delay of the signal with respect to the correlation function of satellite m. $\tau$ can be represented by a number $p_C$ of chip lengths and a residual difference, i.e., $$\tau = p_C T_C + \delta, \quad (5)$$

with $\delta < T_C$, e.g., $\delta = p_S \times T_S$ with $0 \leq p_S < n_S$ with $p_S$, $n_S$ integers and $n_S$ fixed, e.g., $n_S = n_S^+$ and in the example $n_S = 8$. $C_T$ can then, by virtue of the cyclicity of $b_m(t)$ and c(t), be expressed as $$C_T(m, p_C, \delta, f_D) = \left| \int_0^T e^{2\pi i f_D t} b_m(t) c(t - p_C T_C - \delta) dt \right| = \quad (6)$$

$$= |e^{2\pi i f_D p_C T_C}| \times$$

$$\left| \int_{-p_C T_C}^{T-p_C T_C} e^{2\pi i f_D t} b_m(t + p_C T_C) c(t-\delta) dt \right|$$

and finally as $$C_T(m, p_C, \delta, f_D) = \left| \int_0^T e^{2\pi i f_D t} b_m(t + p_C T_C) c(t-\delta) dt \right| \quad (7)$$

As the $C_I(j)$ and $C_Q(j)$ are represented as two or three bit integers it is usually sufficient to represent the components of the values taken on by the frequency function $\exp(2\pi i f_D t)$ as three bit integers as well, reducing the components of the frequency function to step functions which assume eight different values, e.g., according to the following sine/cosine table which shows the values sine(l) and cosine(l) assumed by the step functions in the intervals $I_l$ with $0 \leq l \leq 15$.

| sine/cosine table: | | | | | | | | |
|---|---|---|---|---|---|---|---|---|
| | $I_0$ | $I_1$ | $I_2$ | $I_3$ | $I_4$ | $I_5$ | $I_6$ | $I_7$ |
| sine | 1 | 3 | 4 | 5 | 5 | 4 | 3 | 1 |
| cosine | 5 | 4 | 3 | 1 | −1 | −3 | −4 | −5 |
| | $I_8$ | $I_9$ | $I_{10}$ | $I_{11}$ | $I_{12}$ | $I_{13}$ | $I_{14}$ | $I_{15}$ |
| sine | −1 | −3 | −4 | −5 | −5 | −4 | −3 | −1 |
| cosine | −5 | −4 | −3 | −1 | 1 | 3 | 4 | 5 |

$I_0$ to $I_{15}$ are equal length phase intervals with $I_l = [l \times \pi/8, (l+1) \times \pi/8)$, corresponding to Doppler intervals in time.

Their lengths equal a Doppler length $T_D$ which depends on the Doppler frequency $f_D$ according to $$T_D = \frac{1}{16 f_D}. \quad (8)$$

Figure 2:
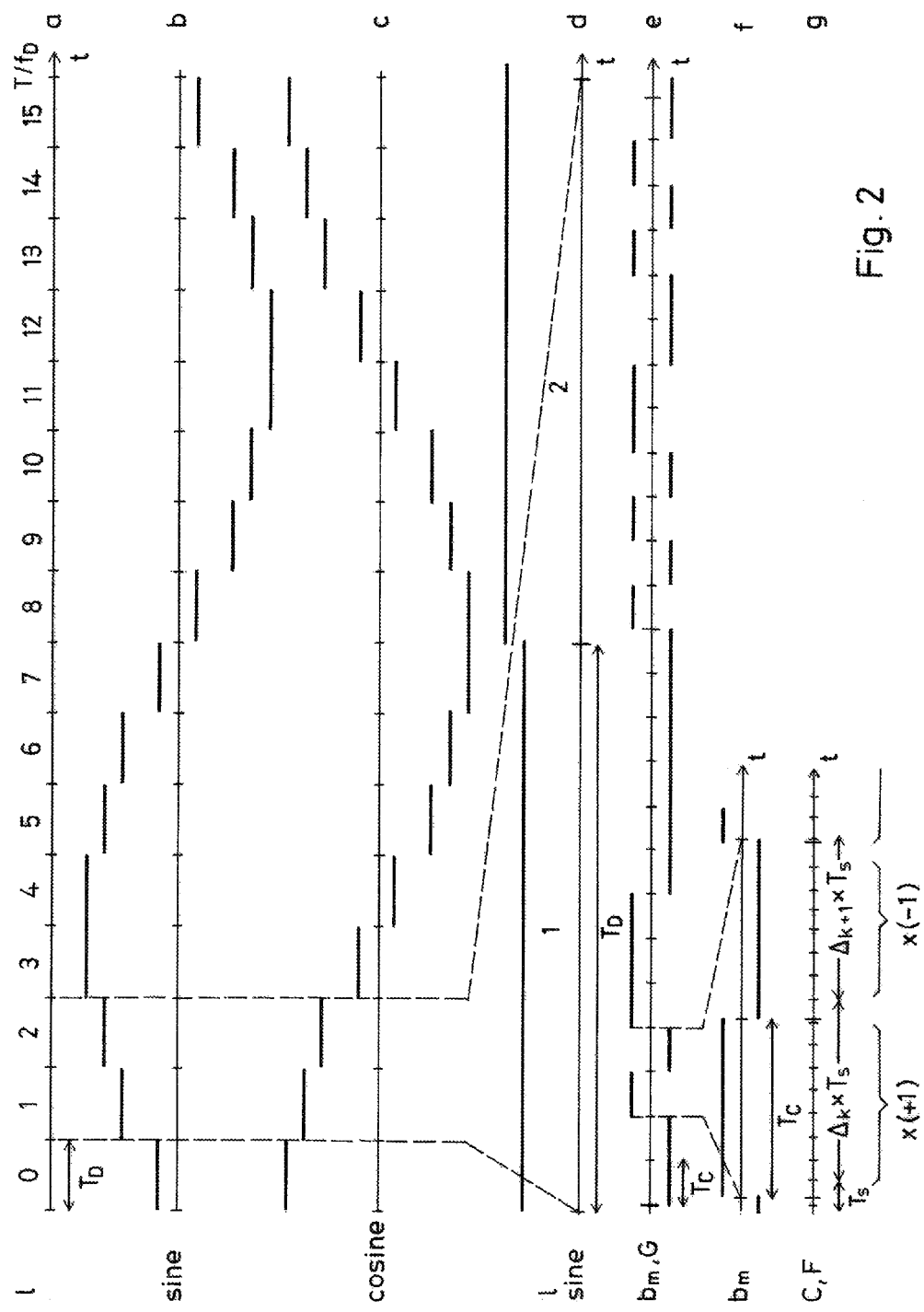
FIG. 2 shows several functions of time used in the method according to the invention.

See also FIG. 2 where a part of the correlation interval extending over one period of sine and cosine is represented in line (a). sine and cosine which are represented in lines (b), (c), respectively, of FIG. 2, are, of course, cyclic functions and extend beyond the interval $[0, 2\pi]$. If $f_D$ equals 5 kHz which is the maximum value normally employed for terrestrial applications (8) leads to $T_D = \frac{1}{80}$ milliseconds=0.0125 milliseconds≈12.79×$T_C$, that is, the Doppler length, e.g., the length of the Doppler intervals where the sine and cosine step functions are constant, is approximately 12.79 chip lengths.

Equation (7) can now be rewritten as $$C_T(m, p_C, \delta, f_D) = \quad (9)$$

$$\sqrt{\left( \left[ \sum_{n=0}^{N_D} \text{cosine}(n) \int_{nT_D}^{\min((n+1)T_D, T)} b_m(t+p_C T_C) c_I(t-\delta) dt - \sum_{n=0}^{N_D} \text{sine}(n) \int_{nT_D}^{\min((n+1)T_D, T)} b_m(t+p_C T_C) c_Q(t-\delta) dt \right]^2 + \right.}$$
$$\overline{\left. + \left[ \sum_{n=0}^{N_D} \text{cosine}(n) \int_{nT_D}^{\min((n+1)T_D, T)} b_m(t+p_C T_C) c_Q(t-\delta) dt + \sum_{n=0}^{N_D} \text{sine}(n) \int_{nT_D}^{\min((n+1)T_D, T)} b_m(t+p_C T_C) c_I(t-\delta) dt \right]^2 \right)}$$

where $N_D=\text{int}(T/T_D)=\text{int}(T\times 16f_D)$.

As $b_m(t)$ is constant over each chip interval an integral of the type $$G_{Co}(n, p_C, \delta) = \int_{nT_D}^{(n+1)T_D} b_m(t + p_C T_C) c_{Co}(t - \delta) dt \qquad (10)$$

where the subscript Co stands for I or Q can be replaced by a sum over preestablished integrals of $c_{Co}$ over chip intervals, each multiplied by a value of $B_m$, i.e., $$G_{Co}(n, p_C, \delta) \approx \sum_{k=K_n}^{K_{n+1}-1} B_m(k + p_C) \int_{kT_C}^{(k+1)T_C} c_{Co}(t - \delta) dt \qquad (11)$$

where $K_0=0$, $K_n=\text{int}(nT_D/T_C+0.5)$ for $n=1, \ldots, N_D$. That is, the sum runs over k's corresponding to chip intervals which overlap with the corresponding Doppler interval either completely or, at the boundaries of the same, at least by half and together make up a partial correlation interval which substantially coincides with the Doppler interval.

In practice the integral on the right side of equation (11) is replaced by a sum over consecutive data values, that is, the data values which fall within one chip interval are added up in each case:

$$\int_{kT_C}^{(k+1)T_C} c(t - \delta) dt \approx \sum_{j=L_k}^{L_{k+1}-1} C(j - p_S), \qquad (12)$$

i.e., sums beginning with an initial value and extending over a number of subsequent values which are distributed essentially over the chip interval.

For a given value of $p_S$, a subsequence of the sequence of chip sums beginning at starting point $p_S$ can be selected in such a way that the digital data values forming the k'th chip sum of the subsequence are essentially distributed over the interval $[kT_C-p_S T_S,(k+1)T_C-p_S T_S]$. For the position numbers $L_k$ of the initial values we have $L_0=0$, $L_k=\text{int}(kT_C/T_S+\frac{1}{2})=\text{int}(kD_S+\frac{1}{2})$ for $k=0, \ldots, K$ with $D_S=N_S/N_C=T_C/T_S$ the chip length divided by the sample length, e.g., the average number of data values per chip and $K=\text{int}(T/T_C)$. That way the position in time $L_k T_S$ of the k'th initial value is always shifted by $-p_S T_S$ with respect to the data value closest to the lower boundary of the k'th chip interval, that is, not more than one half of the sample length $T_S$ away from the same.

For the purpose of determining the position numbers $L_k$ step numbers are calculated according to $$\Delta_0 = L_1$$

$$\Delta_{Lk} = L_{k+1} - L_k, k=1, \ldots, N_c-1 \qquad (13)$$

and stored in the memory unit 21 from which a step length $\Delta_{Lk}\times T_S$ separating the positions of two consecutive initial values is derived in each case. The step number $\Delta_{Lk}$ assumes in each case either a lower step number value $n_S^-=\text{int}(D_S)$ or a higher step number value $n_S^+=\text{int}(D_S)+1$ where $D_S>\text{int}(D_S)$. Of course, in the exceptional case where $D_S$ is an integer, only one step number value $n_S=D_S$ is assumed. In the example $N_S=8{,}000$ and $N_C=1{,}023$ and we have $D_S\approx 7.82$. $\Delta_{Lk}$ therefore equals eight in most cases, with some exceptions where $\Delta_{Lk}$ equals seven.

For the remaining values of i $$\Delta_i = \Delta_{Lk}, L_{k-1} < i < L_k, \qquad (14)$$

which can again be extended cyclically and leads, together with equation (12), to $$\int_{kT_C}^{(k+1)T_C} c(t - \delta) dt \approx \sum_{j=L_k-p_S}^{L_k-p_S+\Delta_{Lk}-1} C(j - p_S) = F(L_k - p_S). \qquad (15)$$

As the $\Delta_i$ each assume one of two values they can each be encoded by a single bit. And, as apparent from equation (15), it is sufficient to store the said bit for each of the $\Delta_{Lk}$, $k=0, \ldots, N_C-1$ only. The summation according to equation (1) also uses the step lengths, e.g., every chip sum $F(L_k)$ consists of $\Delta_{Lk}$ digital data values beginning with its initial value and involving all data values which come before the initial value of the subsequent chip sum $F(L_{k+1})$. By equation (14) this extends to the $F(L_k-p_S)$ with $1 \leq p_S < n_S^+$. Therefore no overlap occurs within the subsequence and every digital data value appears exactly once.

It is also possible to let the summation always run over the larger of the two step numbers, $n_S^+$ or, preferably, the one which is closer to $D_S$. In the example eight consecutive data values are then added up to form a chip sum in each case, with an overlap of one where the step number $\Delta_i$ equals seven. This leads, however, to a slight distortion of the correlation sums in the immediate vicinity of the correlation peak.

Preferably, two complete sequences of chip sums are calculated, one with $n_S^+$ data values and one with $n_S^-$ data values added up in each case in advance in FIR filter circuits 18a,b and stored in memory unit 21 and the value from the appropriate sequence chosen according to the step number in each case. After calculation of a first $n_S^-$-value chip sum $F^-(0)$ this can be done recursively according to $$F^+(i) = F^-(i) + C(i + n_S^-)$$

$$F^-(i+1) = F^+(i) - C(i) \qquad (16)$$

where $F^-$ stands for the shorter and $F^+$ for the longer sum in each case.

Of course, this recursion is applicable independently of the summation number, e.g., the number of data values which are added up to form the chip sums, which implies that the calculation of the chip sums is, apart from $F^-(0)$, virtually independent of the sampling rate and the consequent upper limit of achievable phase resolutions.

The sequence of selected chip sums corresponds to the sequence $F(i)$, $i=0, \ldots, N_S-1$ according to equation (1). The positions in time of consecutive data values $C(j)$ which are added up to form the chip sums $F(i)$ are indicated in line (g) of FIG. 2, together with the chip intervals and step lengths.

The sums $F(i)$ are each multiplied by the value of $b_m$ in line (f) of FIG. 2. As a consequence, using equations (11) and (15), equation (10) leads to $$G_{Co}(n, p_C, p_S) \approx \sum_{k=K_n}^{K_{n+1}-1} B_m(k + p_C) F_{Co}(L_k - p_S), \qquad (17)$$

which is used in calculating the $G_{Co}(n,p_C,p_S)$. According to the definition of the $K_n$ above the chip intervals corresponding to the $B_m$ in equation (17) are those which overlap with the $n^{th}$ Doppler interval, either completely or, at the boundary of the latter, by more than half. The correlation values $B_m$ are provided in that they are read from memory unit 21. They can be permanently stored in a ROM section of the same or in a RAM section in which case they are generated and stored when the GPS receiver starts up.

The partial correlation intervals used for calculating partial correlation sum components $G_{Co}(1,p_C,p_S)$ and $G_{Co}(2,p_C,p_S)$ and the values assumed by $b_m(t)$ therein are indicated in line (e) of FIG. 2. As the $L_k$ can be calculated recursively from the $\Delta_{Lk}$ with $L_{k+1}=L_k+\Delta_{Lk}$ only $N_C=1{,}023$ bits are necessary for encoding the step lengths $L_k$. With the sums F(i) having been precalculated and stored in the memory unit 21 processing requirements for calculating the partial correlation sums of (17) are modest. The latter can then be used together with the values of sine and cosine from the sine/cosine table for the calculation of the correlation sum $C_T(m,p_C,\delta,f_D)$:

$$C_T(m, p_C, p_S, f_D) == \sqrt{\left\{ \left[\left[\sum_{n=0}^{N_D}\operatorname{cosine}(n)G_I(n, p_C, p_S) -- \sum_{n=0}^{N_D}\operatorname{sine}(n)G_Q(n, p_C, p_S)\right]^2 ++ \left[\sum_{n=0}^{N_D}\operatorname{cosine}(n)G_Q(n, p_C, p_S) ++ \sum_{n=0}^{N_D}\operatorname{sine}(n)G_I(n, p_C, p_S)\right]^2\right]\right\}} \quad (18)$$

sine(n) and cosine(n) are in each case read from memory unit 21. Again, they can be permanently stored in a ROM section of the same or calculated when the GPS receiver starts up. sine(1) and sine(2) are represented in line (d) of FIG. 2. Multiplied with $G_{Co}(1,p_C,p_S)$ and $G_{Co}(2,p_C,p_S)$, respectively, they contribute to the second and fourth term of the right hand side of equation (18) depending on whether Co=Q or Co=I, respectively.

The correlation process can be carried out with different phase resolutions where neighbouring phase positions of the correlation sequence with respect to the data sequence differ in time at least approximately by a fixed resolution length. For instance, a subsequence $q_r$, r=0, ..., R can be chosen from the possible values of $p_S$, e.g., 0, ..., 7. For maximum resolution $q_r$ runs through all possible values, the resolution length equaling the sampling length $T_S$, but the resolution length $T_R$ can also be chosen to be a multiple of, e.g., twice or four times, the sampling length $T_S$.

Alternatively, the resolution length $T_R$ can be some fraction of the chip length, e.g., $T_C/R$ with R essentially limited by the number of samples per chip. R is preferably but not necessarily an integer. $q_r$, r=0, ..., R are chosen with $q_R T_S < T_C$ and $(q_R+1)T_S > T_C$ and such that $q_R T_S$ is as close as possible to the end point of an interval beginning at the starting point of the first subsequence and having a length of $rT_R$, e.g., has a distance from the said end point of not more than half the chip length $T_S$. The position of the starting point of the first subsequence shifted by $q_r T_R$ then defines the starting point of a further subsequence for every r. Usually, the resolution length $T_R$ is between one half of the chip length $T_C$ and the sampling length $T_S$.

Figure 3:
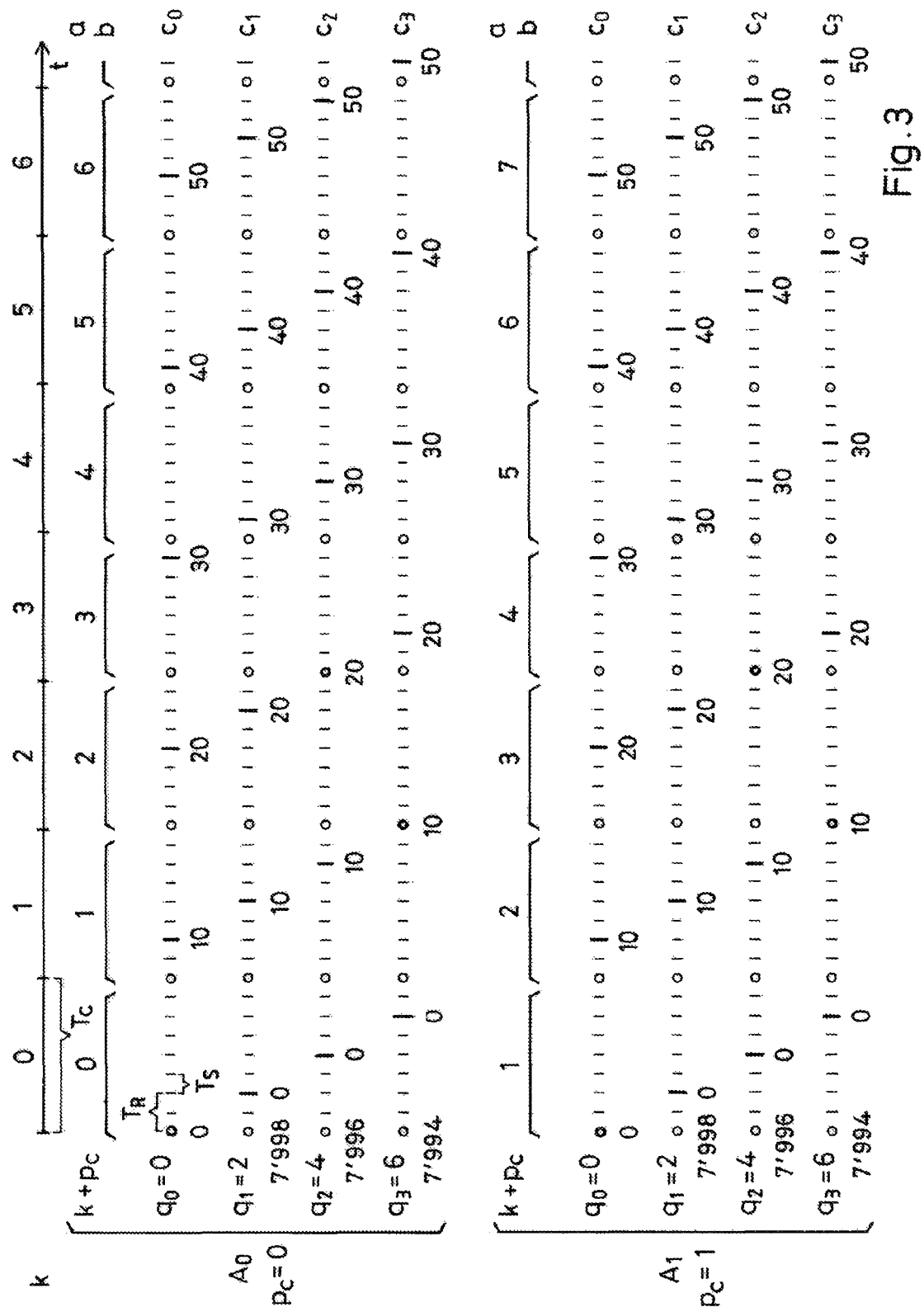
FIG. 3 shows a sequence of data values in various phase relations with a characteristic sequence.

FIG. 3 shows an example (see also equation (17)) where the resolution length R equals $2T_S$, e.g., $q_0=0$, $q_1=2$, $q_3=4$ and $q_4=6$. At the top is the number k. $A_0$ shows in (a) the position $k+p_C$ of the correlation value $B_m$ of the characteristic sequence with $p_C=0$, in (b) the intervals covering in each case the data values forming the chip sum which is multiplied by the respective $B_m$ and in ($c_0$) to ($c_3$) the data values and their numbers with the initial position $L_k-q_r$ of every chip sum in the sequence of digital data values marked by a circle. The starting positions of the subsequences of chip sums are 0, $-2T_S=7{,}998T_S$, $-4T_S=7{,}996T_S$, and $-6T_S=7{,}994T_S$, respectively, the starting positions of the second to fourth subsequences all within a chip length $T_C$ of the starting position 0 of the first subsequence.

After a correlation sum has been calculated with every one of the $p_r$—with the $p_r T_S$ essentially covering a chip length $T_C$—for the calculation of the next correlation sums the correlation function is shifted by one chip in that $p_C$ is replaced by $p_C+1$ and the process repeated. This is shown in $A_1$ ($p_C=1$) where $q_r$ runs again through its set of values 0, 2, 4, 6. As stated above, the sequence of chip sums F(i) is considered a cyclic sequence and negative values of the argument are interpreted accordingly.

To sum it up:

First, from the incoming complex data values C(j) complex chip sums are formed in FIR filter circuits 18a,b from which the F(i) according to (1) for i=0, ..., $N_S-1$ can be selected and delivered to base-band processor 5 where they are stored in memory unit 21. $\Delta_{Lk}$, k=0, ..., $N_C-1$ have been calculated at start-up and also stored in memory unit 21 (see FIG. 2(g)) but it is also possible to store precalculated values for the $\Delta_{Lk}$ in a ROM.

Partial correlation sums $G(n,p_C,p_S)$ are then established by multiplying selected chip sums F(i) spaced by position numbers $L_k$ each by the appropriate correlation value $B_m(k)$ according to equation (17) (see FIG. 2(f), (e)) where the parameter $p_C$ defining the part of the difference in phase positions between the data sequence and the basic sequence which is a multiple of the chip length $T_C$ and the parameter $p_S$ defining the residual difference in phase positions are taken into account. The step performs only $2N_C$ integer multiplications and its requirements as to processing power are correspondingly modest. All such products are added up over a corresponding partial correlation interval, e.g., the union of chip intervals overlapping by more than 50% with a Doppler interval.

Finally, each one of the partial correlation sums $G(n,p_C,p_S)$ is multiplied by the value (cosine(n),sine(n)) the frequency function takes on in the corresponding Doppler interval (or the phase interval $I_1$ which corresponds to the same (see FIG. 2(e), (d)) and the products are added up over the Doppler intervals covering the correlation interval to yield the correlation sum which still depends on the parameters $p_C$, $p_S$ and $f_D$. It is, of course, possible to add up all partial correlation sums which pertain to a Doppler interval where the frequency function assumes a certain value and then multiply the sum with the latter, thereby reducing the number of multiplications, in particular, where the Doppler frequency is high and several periods of the frequency function are contained in the correlation interval. In any case, the step as explained performs only relatively few integer multiplications and is very efficient.

Depending on the Doppler frequency, the last Doppler interval can be shorter than the others which, however, does not change the process explained above. It is generally possible to use frequency functions whose periods do not divide the 1 millisecond basic interval or the correlation interval, e.g., where the Doppler frequency $f_D$ is largely arbitrary and, in particular, is not a multiple of 1 kHz.

It should also be noted that with a sufficiently low Doppler frequency and a short correlation interval, Doppler compensation may not be necessary. There will be only one Doppler interval in this case which coincides with the correlation interval. This implies that the correlation sum consists of only one partial correlation sum.

The calculation of the correlation sum is repeated for different values of $p_C$ and of $p_S$ according to the desired phase resolution, e.g., the resolution length $T_R$ which has been chosen for the correlation. For maximum resolution, $p_C$ varies over $0, \ldots, N_C-1$ and $p_S$ over $0, \ldots, n_S^-$.

The above-described correlation method can be modified in various ways. In the representation of the frequency function, it is, of course, possible to use resolutions which deviate from the 3 bit resolution of the example. For instance, resolutions of between one and five bit can be used, in particular, where similar resolutions are employed for the data values. Furthermore, Doppler intervals need not be of equal lengths. However, by the use of equal length Doppler intervals calculations are simplified and overhead reduced while losses are negligible. Also, it is convenient if Doppler intervals coincide for both components of the frequency function.

The correlation interval may extend about several consecutive basic intervals. If the length of the correlation interval is restricted to about ten basic intervals, e.g., 10 milliseconds, the Doppler shifts of the superposed satellite signals have still negligible influence on the coherence and the likelihood of a data bit change within the correlation interval is still fairly small.

The quotient of the chip length $T_C$ and the sampling length $T_S$ which in the example is about 7.82 can, of course, have other values. It can be an integer but usually it will be a real number somewhere between two consecutive integers, a lower step number value and a higher step number value, and the actual step number will toggle between them.

The above-described method can be used for signal acquisition as well as for tracking. At signal acquisition the correlation values $C_T$ can be used as correlation indicators in that maxima over satellite number m, phase shift τ, e.g., $p_C$ and $p_S$, and Doppler frequency $f_D$ are identified and compared with certain fixed or noise-dependent thresholds. Phase positions can be scanned with a resolution of up to approximately one sample length, e.g., about one eighth of a chip length in the example, but normally it may be sufficient to use lower resolutions. The Doppler frequency resolution can be chosen in an essentially arbitrary manner.

If a scan does not lead to sufficiently pronounced correlation values the cause may be clock drift. In that case, as already indicated, the frequency of the mixer 15 can be tentatively adjusted. After acquisition of a first signal the clock drift is known with a precision of ±5 kHz and the combined effects of clock drift and Doppler shift can be compensated by the mixer 15. Further scans can be restricted to a range which is limited by the maximum difference in Doppler shifts, e.g., a ±10 kHz interval.

After acquisition of a sufficient number of satellite signals for every satellite copies of the correlation function with zero phase shift and positive and negative phase shifts of multiples of the resolution length $T_R$ are correlated with the data sequence. A triangular fit can then be based on the correlation sums calculated with early, prompt and late copies of the correlation function and the exact phase position derived.

Although most adaptations for other GNSS systems are straightforward, an application in the context of the GALILEO system uses a modification of the formation of chip sums. While for GPS a sum of consecutive digital data values is adequate, Galileo uses a slightly more complicated linear combination of the said data values. This is due to the binary offset carrier which causes a sign change in the middle of every chip. This must be compensated by a sign change in the formation of the chip sums, e.g., in that the second half of the digital data values used to form the chip sum are multiplied by −1. Where the summation number is odd, the central data value can be dropped.

Although the inventive method is highly suitable for being carried out in part on a general purpose microprocessor it is also possible to provide a receiver where the front-end circuit and the base-band processor are both realised as dedicated hardware which may consist of two separate chips or be integrated on one chip.

Apart from GNSS systems, the method and receiver according to the invention can also be applied to the processing of other types of direct-sequence spread spectrum (DSSS) signals as used, e.g., in cellular telephony (UMTS) and WLANs.

Some portions of the detailed description above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or "checking" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus or mobile device for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

| List of reference symbols | |
|---|---|
| 1 | antenna |
| 2 | front-end circuit |
| 3 | band pass filter |
| 4 | TCXO |
| 5 | base-band processor |
| 6 | PLL unit |
| 7 | low noise amplifier |
| 8 | controllable RF amplifier |
| 9a,b | mixers |
| 10a,b | high pass filters |
| 11a,b | low pass filters |
| 12a,b | programmable gain amplifiers |
| 13a,b | A/D converters |
| 14a,b | high pass filters |
| 15 | complex mixer |
| 16a,b | low pass filters |
| 17a,b | down-samplers |
| 18a,b | FIR filter circuits |
| 19a,b | data converters |
| 20 | microprocessor |
| 21 | memory unit |

The invention claimed is:

1. A method of processing a digital signal derived from a direct-sequence spread spectrum analog signal containing at least one encoded binary sequence consisting of repetitions of a characteristic basic sequence which extends over a basic interval to determine a multiplicity of correlation sums, the method comprising:

providing, in a receiver, a correlation sequence corresponding to the basic sequence which consists of correlation values of +1 and −1 each pertaining to one of a series of consecutive chip intervals having a constant chip length, deriving, in the receiver, from the digital signal a data sequence consisting of data values which follow upon each other separated in each case by a sampling interval, the sampling intervals having a constant sampling length which is not greater than one half of the chip length such that a plurality of consecutive data values is contained in a chip interval in each case, and correlating, in the receiver, the data sequence with a plurality of copies of the correlation sequence, the copies having different phase positions with respect to the data sequence, and forming a correlation sum comprising products of correlation values and data values over a correlation interval in each case, wherein a sequence of overlapping chip sums is formed by calculating, for every data value, at least one chip sum with the data value as an initial value, where the chip sum is in each case a linear combination of data values in a set consisting of the initial value and immediately subsequent data values, wherein the summation number of data values contained in the set multiplied by the sampling length differs in each case by at most the sampling length from the chip length, a series of subsequences of chip sums is formed, each subsequence selected from the sequence of chip sums, with the position of the initial value of a first chip sum as a starting point, in such a way that at every end point of an interval beginning at the starting point of a first subsequence and having a length corresponding to a multiple of a resolution length which is not greater than half the chip length, at least where the end point is situated within a chip length from the said starting point, there is a starting point of a further subsequence whose position differs from the position of the said end point by not more than one half of the sampling length, and each subsequence has, for every end point of an interval beginning at its starting point and having a length corresponding to a multiple of the chip length, an initial value whose position differs from the position of the said end point by not more than one half of the sampling length, and wherein for every subsequence, every chip sum is multiplied with one corresponding correlation value of the correlation sequence and the products summed up over a partial correlation interval to form a partial correlation sum which is then used for the determination of one of the correlation sums.

2. The method of claim 1, wherein the distance separating the positions of two consecutive initial values of a subsequence equals in each case the sampling length multiplied by a step number based on either a lower step number value or a higher step number value which are the integers closest to the quotient resulting from the division of the chip length by the sampling length.

3. The method of claim 2, wherein the step numbers are in each case calculated prior to the formation of the partial correlation sum, and encoded by a single bit stored in a memory unit.

4. The method of claim 2, wherein the summation number for a chip sum used for forming the partial correlation sum equals in each case the step number used to calculate the distance separating the positions of the initial value of the chip sum and the initial value of the subsequent chip sum of the subsequence.

5. The method of claim 4, wherein, where applicable, chip sums are formed with each of the two step number values used as a summation number in each case.

6. The method of claim 1, wherein the summation number for every chip sum equals the integer closest to the quotient resulting from the division of the chip length by the sampling length.

7. The method of claim 1, where the resolution length equals the sampling length or a multiple thereof.

8. The method of claim 1, where the analog signal is a Global Navigation Satellite System signal and a residual carrier which reflects at least one Doppler shift of a component of the analog signal is superposed on the data sequence, for tentative removal of the Doppler shift, multiplying each of the digital data values by a value of a frequency function which assumes one of a finite number of constant values in each of a series of consecutive Doppler intervals, the Doppler length of each of which is at least twice the chip length in each case, and for each Doppler interval, choosing a sequence of consecutive chip intervals, which overlap with the Doppler interval at least by half, as a partial correlation interval, the corresponding partial correlation sum is established and the products of each partial correlation sum and the value of the frequency function assumed by the same in the Doppler interval added up over the correlation interval for the determination of the correlation sum.

9. The method of claim 8, wherein a sum over all partial correlation sums pertaining to a value of the frequency function is formed and then multiplied by the said value in each case before the products are added up.

10. The method of claim 8, wherein the data values are complex values and the frequency function is a complex step function approximating a complex exponential function.

11. The method of claim 10, wherein each of the two components of the frequency function is encoded by a number comprising between one bit and five bits.

12. The method of claim 8, wherein, before being multiplied with a partial correlation sum or a sum of partial correlation sums the value of the frequency function is in each case read from a memory unit.

13. The method of claim 8, wherein the Doppler intervals have each the same Doppler length.

14. The method of claim 1, wherein the correlation interval has the length of a basic interval.

15. A receiver comprising a front-end circuit with mixers and analog-to-digital converters for determining, from a direct-sequence spread spectrum analog signal containing at least one encoded binary sequence consisting of repetitions of a characteristic basic sequence which extends over a basic interval, a multiplicity of correlation sums, in deriving, from the said analog signal, a digital signal consisting of data values which follow upon each other separated in each case by a sampling interval, the sampling intervals having a constant sampling length which is not greater than one half of the chip length such that a plurality of consecutive data values is contained in a chip interval in each case, and for providing a correlation sequence corresponding to the basic sequence which consists of correlation values of +1 and −1 each pertaining to one of a series of consecutive chip intervals having a constant chip length, the front-end unit further comprising finite impulse response filter circuits for forming a sequence of overlapping chip sums by calculating, for every data value, at least one chip sum with the data value as an initial value, where the chip sum is in each case a linear combination of data values in a set consisting of the initial value and immediately subsequent data values, where the summation number of data values contained in the set multiplied by the sampling length differs in each case by at most the sampling length from the chip length, and the receiver further comprising a base-band processor with a microprocessor unit and a memory unit configured for correlating the data sequence with a plurality of copies of the correlation sequence, the copies having different phase positions with respect to the data sequence, and forming, in each case, one of the correlation sums comprising products of correlation values and data values over a correlation interval, in that a series of subsequences of chip sums is formed, each subsequence selected from the sequence of chip sums, with the position of the initial value of a first chip sum as a starting point, in such a way that at every end point of an interval beginning at the starting point of a first subsequence and having a length corresponding to a multiple of a resolution length which is not greater than half the chip length, at least where the end point is situated within a chip length from the said starting point, there is a starting point of a further subsequence whose position differs from the position of the said end point by not more than one half of the sampling length, and each subsequence has, for every end point of an interval beginning at its starting point and having a length corresponding to a multiple of the chip length, an initial value whose position differs from the position of the said end point by not more than one half of the sampling length, and where for every subsequence, every chip sum is multiplied with one corresponding correlation value of the correlation sequence and the products summed up over a partial correlation interval to form a partial correlation sum which is then used for the determination of one of the correlation sums.

16. The receiver of claim 15, wherein the distance separating the positions of two consecutive initial values of a subsequence equals in each case the sampling length multiplied by a step number based on either a lower step number value or a higher step number value which are the integers closest to the quotient resulting from the division of the chip length by the sampling length.

17. The receiver of claim 15, where the analog signal is a Global Navigation Satellite System signal and a residual carrier which reflects at least one Doppler shift of a component of the analog signal is superposed on the data sequence, and, the base-band processor is further configured to tentatively remove the Doppler shift by:

multiplying each of the digital data values by a value of a frequency function which assumes one of a finite number of constant values in each of a series of consecutive Doppler intervals, the Doppler length of each of which is at least twice the chip length in each case, and for each Doppler interval, choosing a sequence of consecutive chip intervals, which overlap with the Doppler interval at least by half, as a partial correlation interval, the corresponding partial correlation sum is established and the products of each partial correlation sum and the value of the frequency function assumed by the same in the Doppler interval added up over the correlation interval for the determination of the correlation sum.

18. The receiver of claim 15, wherein a sum over all partial correlation sums pertaining to a value of the frequency function is formed and then multiplied by the said value in each case before the products are added up.

19. The receiver of claim 15, wherein the data values are complex values and the frequency function is a complex step function approximating a complex exponential function.

* * * * *